UNITED STATES PATENT OFFICE.

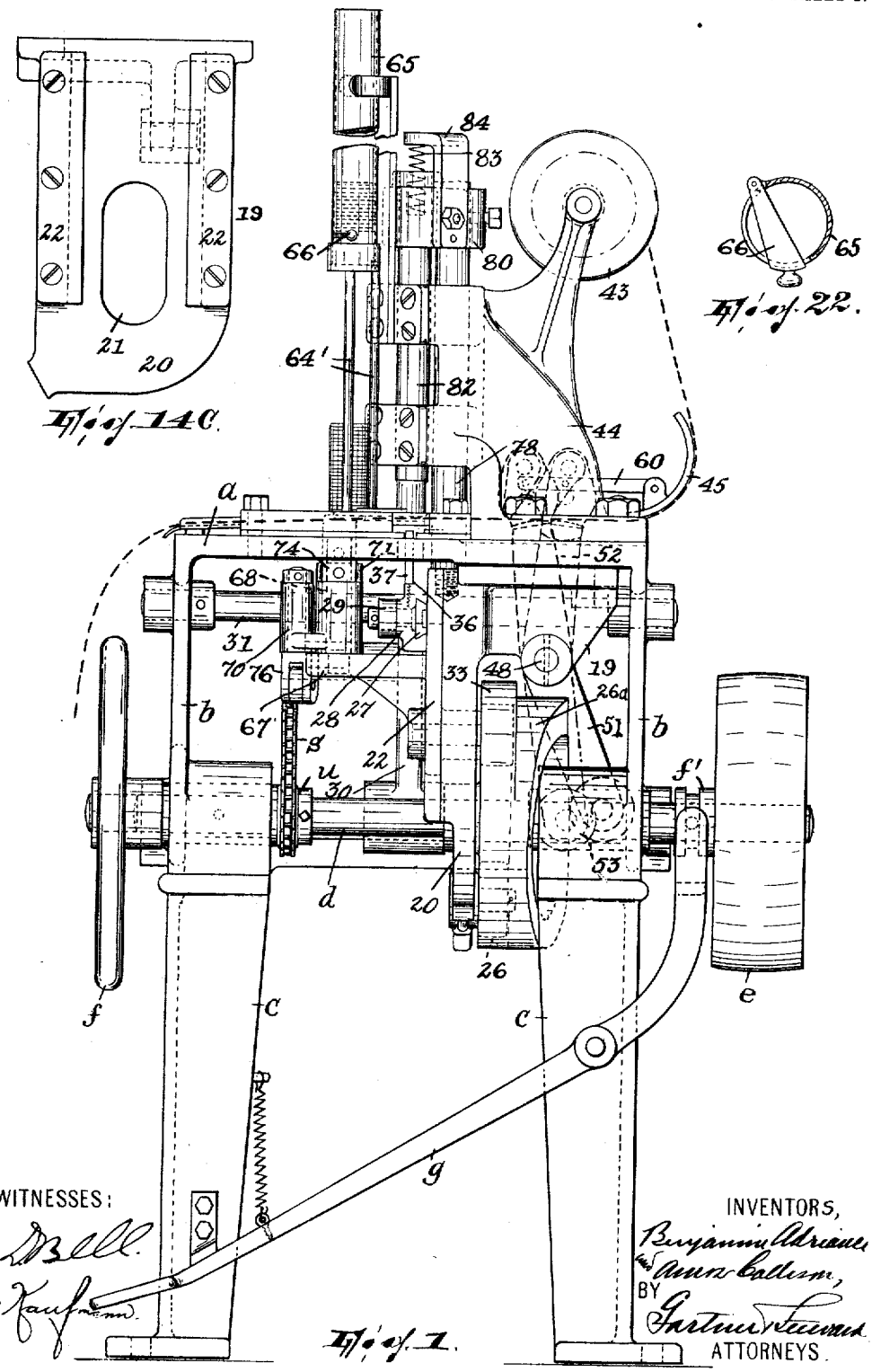

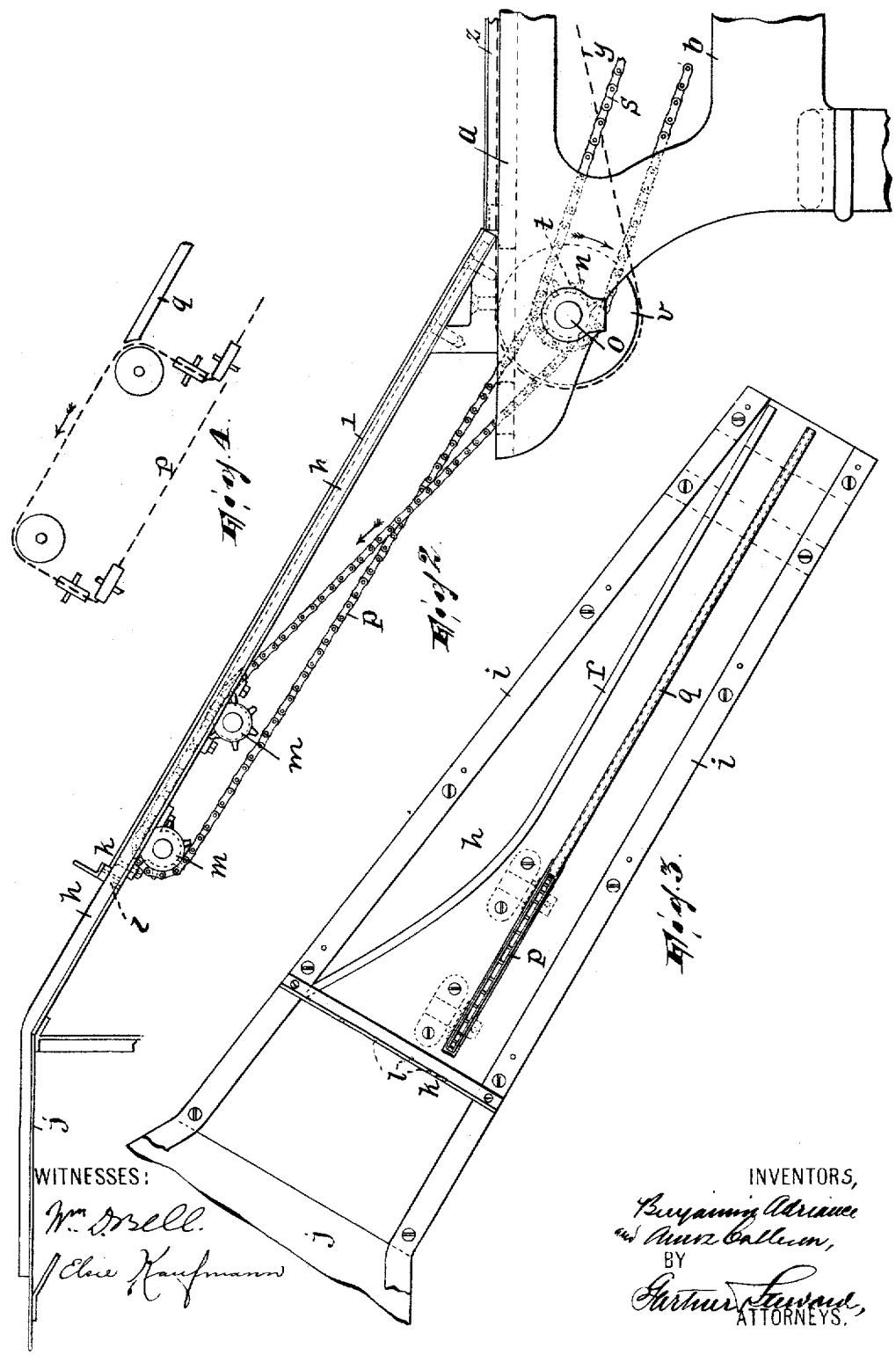

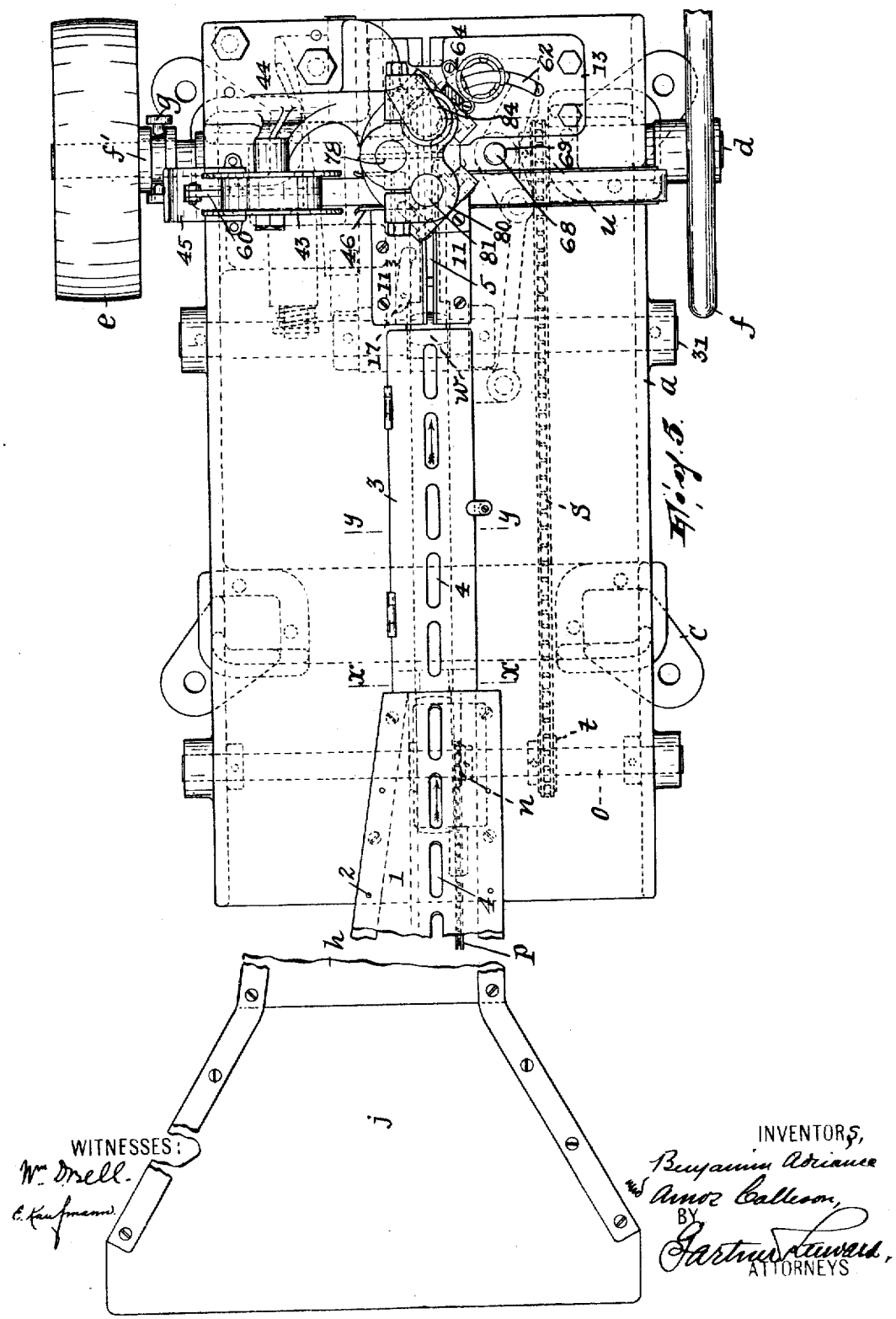

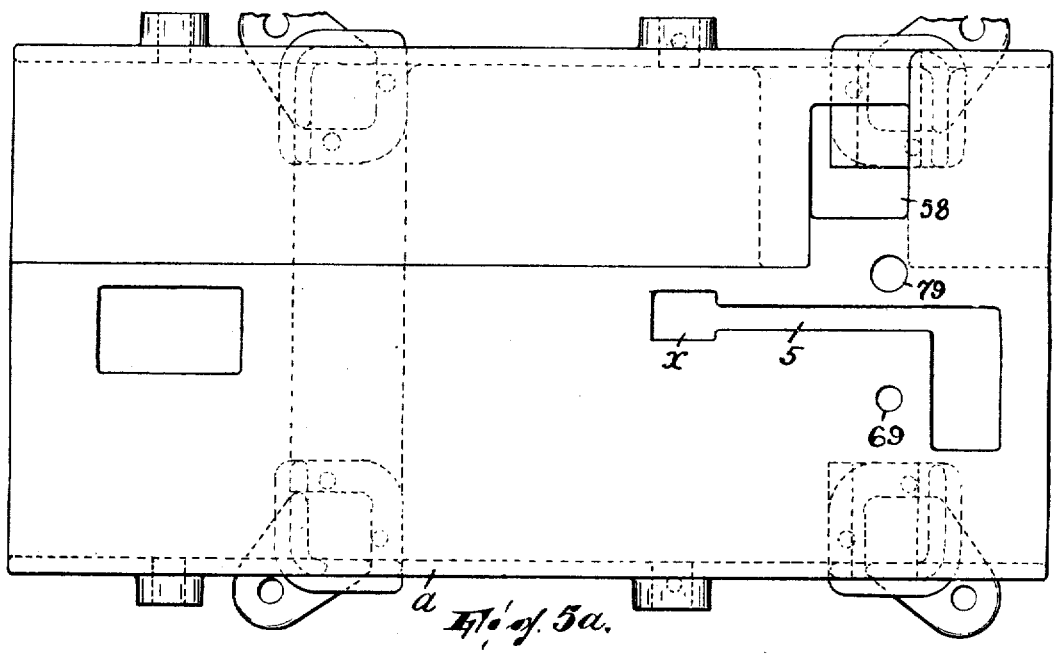
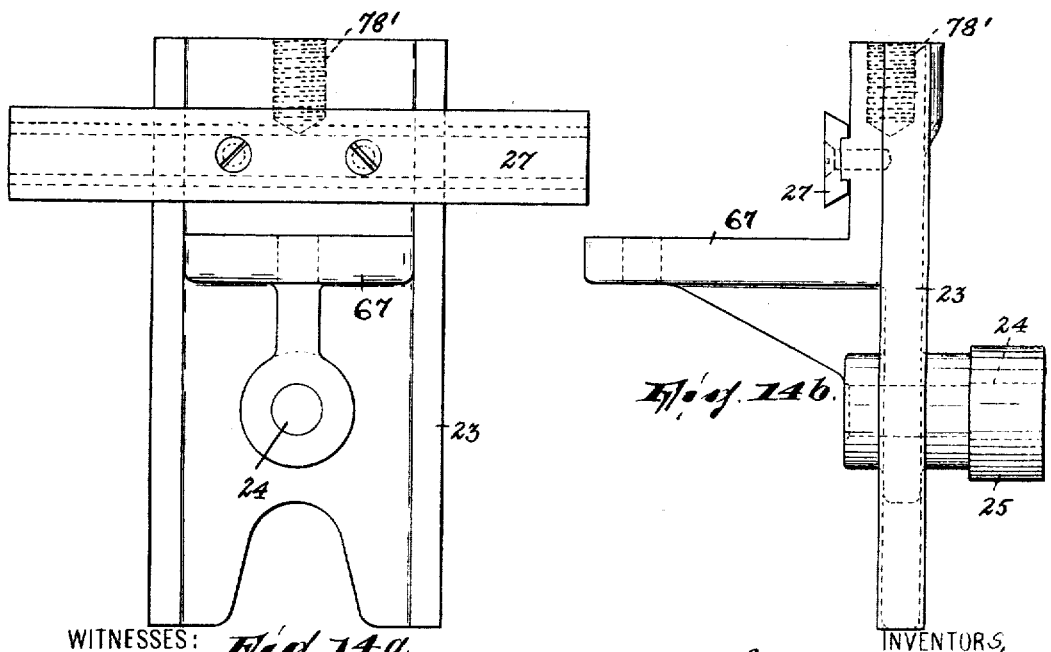

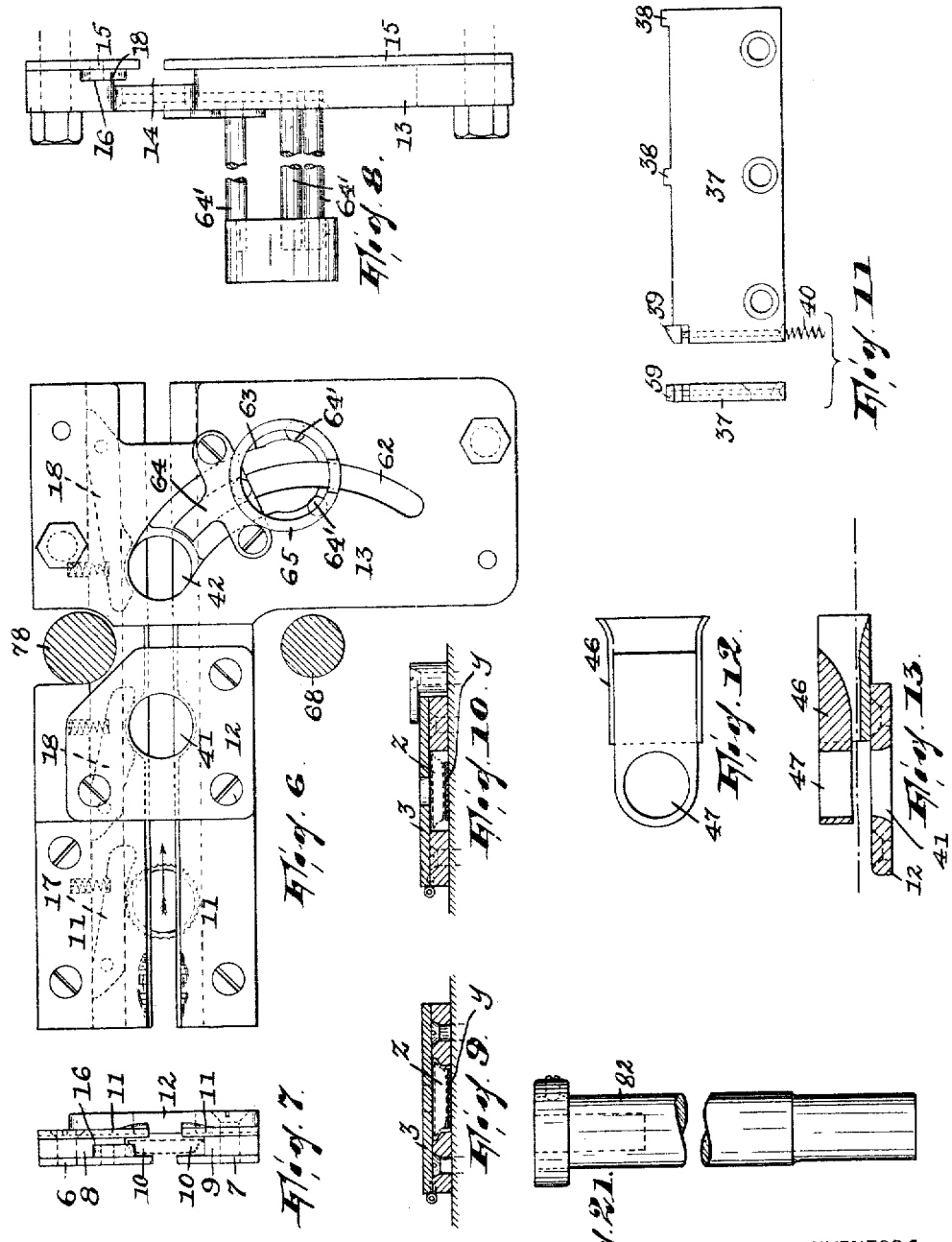

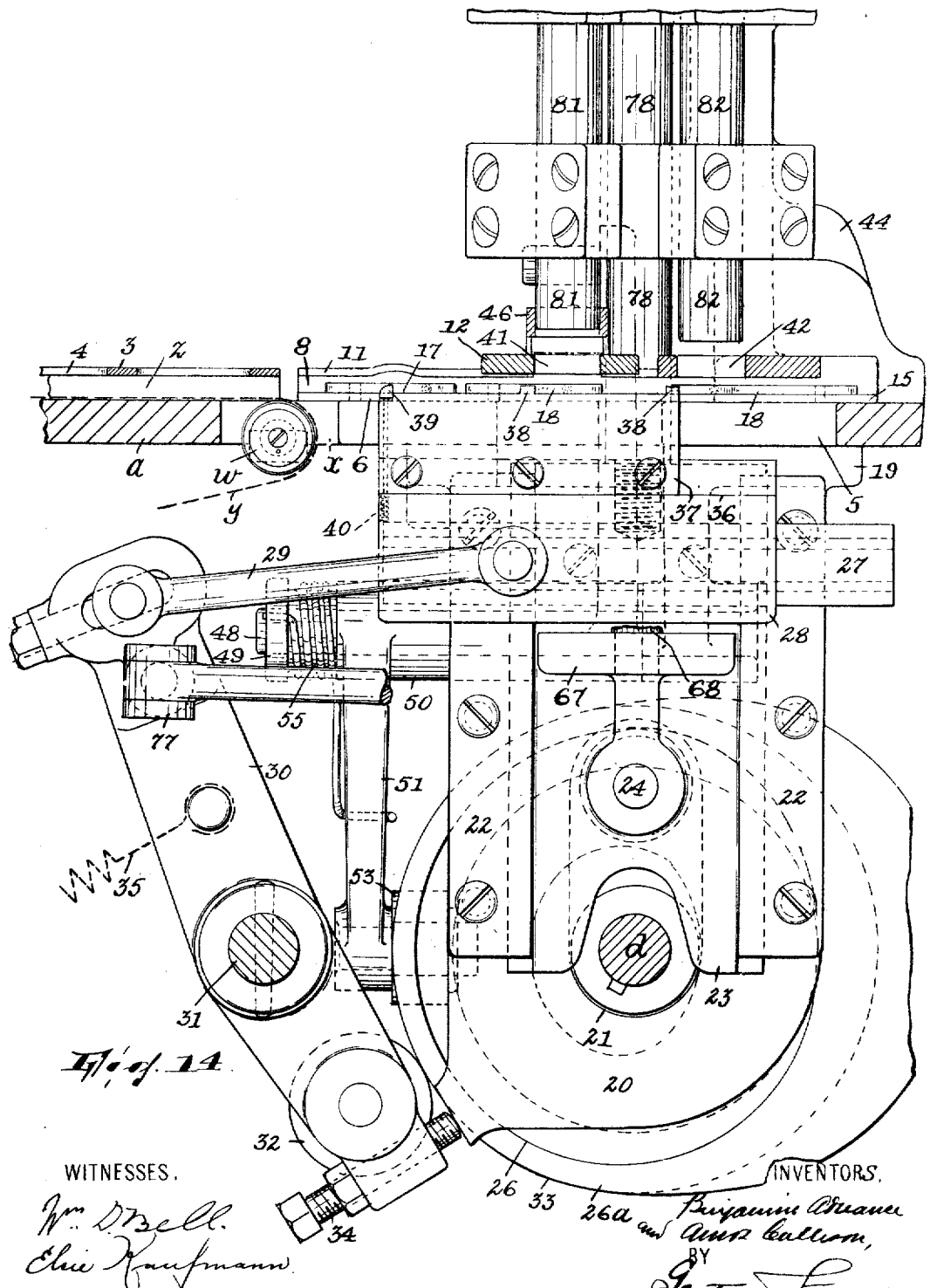

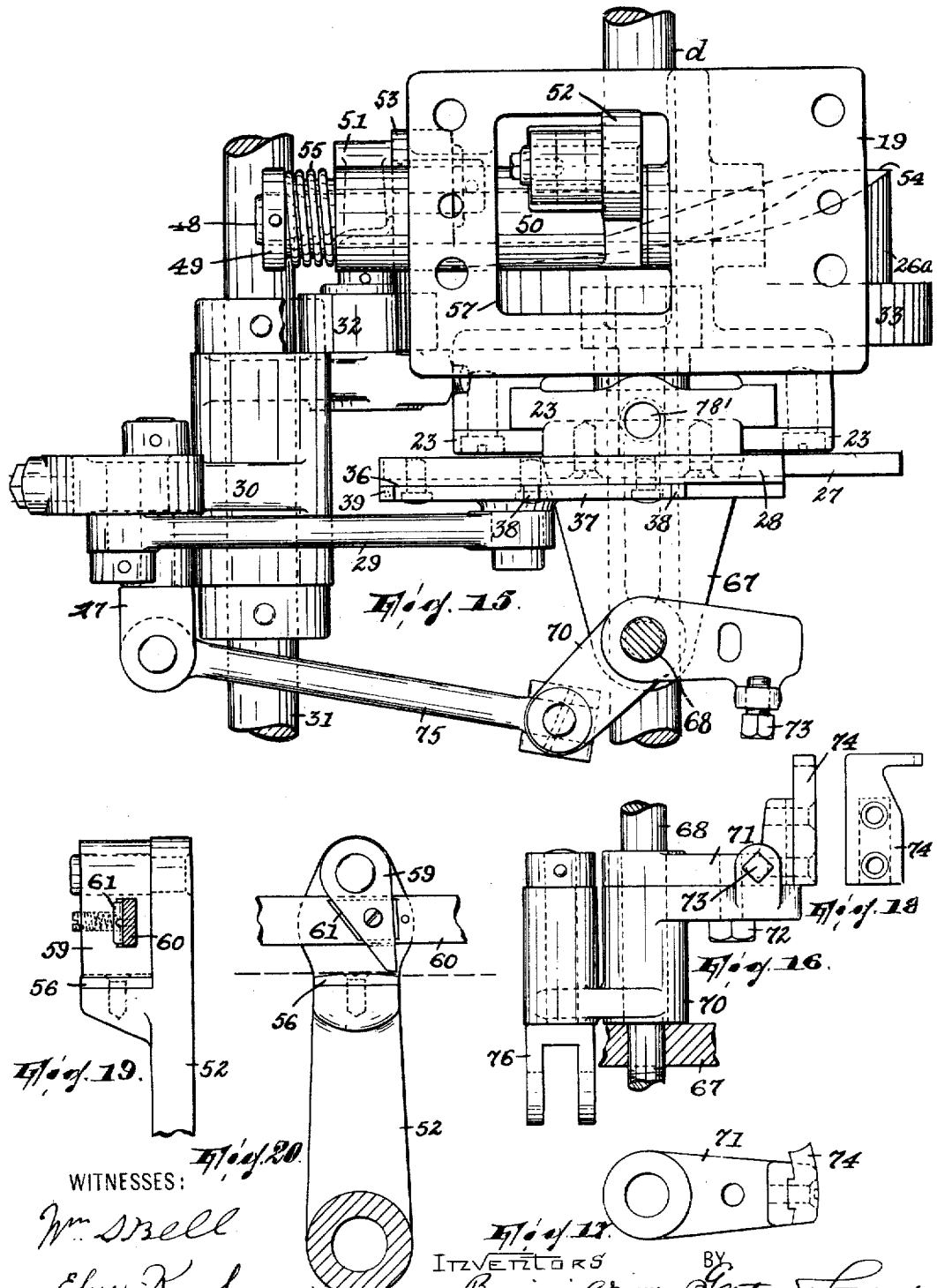

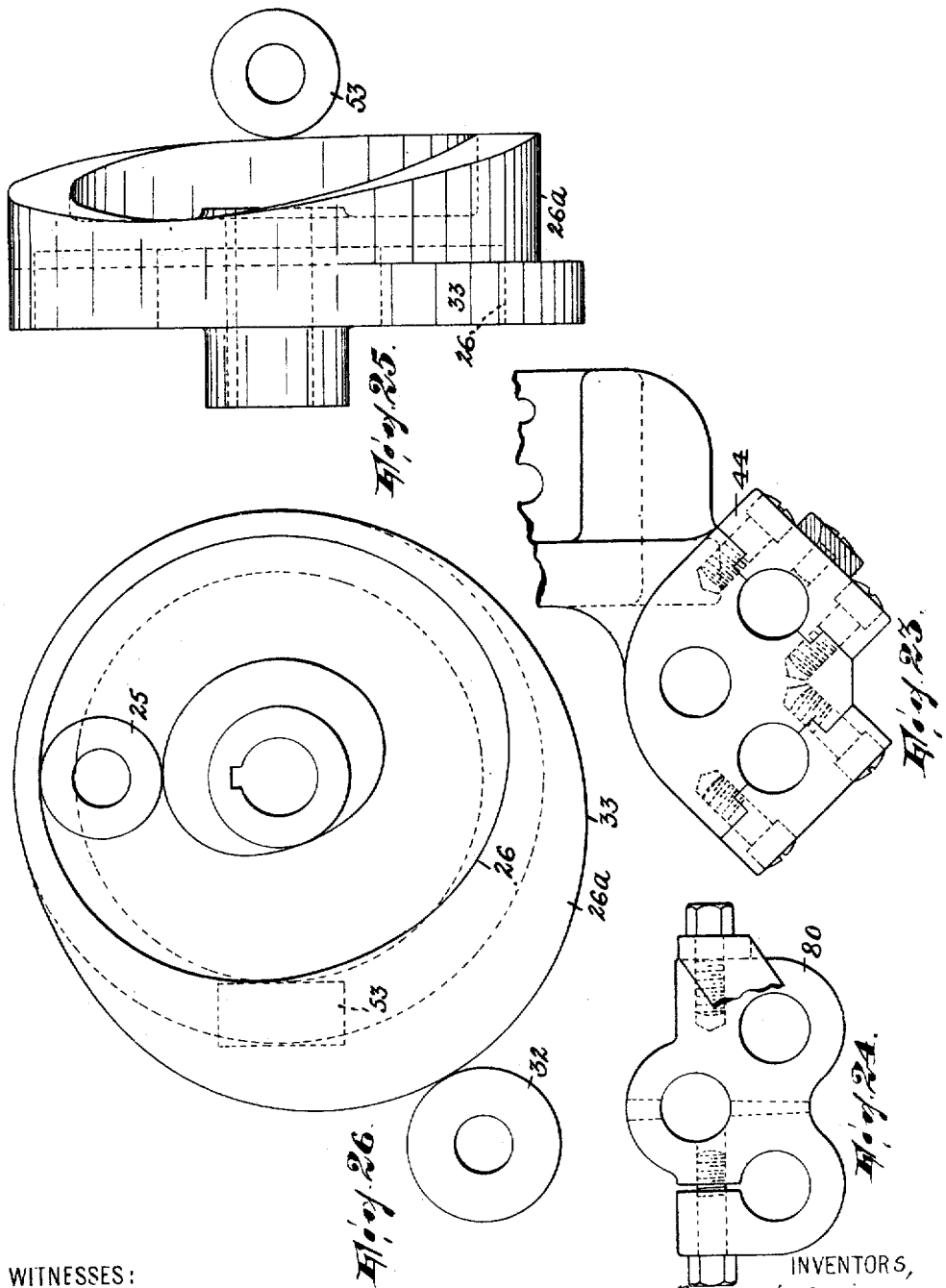

BENJAMIN ADRIANCE AND AMOS CALLESON, OF BROOKLYN, NEW YORK; SAID CALLESON ASSIGNOR TO SAID ADRIANCE.

BOTTLE-CAP-ASSEMBLING MACHINE.

947,272.  Specification of Letters Patent.  Patented Jan. 25, 1910.

Application filed July 22, 1907. Serial No. 384,964.

*To all whom it may concern:*

Be it known that we, BENJAMIN ADRIANCE and AMOS CALLESON, citizens of the United States, residing in Brooklyn, county of Kings, State of New York, have invented certain new and useful Improvements in Bottle-Cap-Assembling Machines; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention consists in a machine for assembling the three essential parts of the so-called "crown" caps for bottles, said parts being a crimped sheet metal cap proper, a cork disk inclosed therein and adapted to directly take the impact of the bottle mouth and a wax-paper disk interposed between the cork disk and the top of the cap. The machine comprehends means for punching or cutting out from strips the paper disks and means for thereupon introducing them, and the cork disks, in proper sequence into the caps proper, and the invention has for its principal object to so construct said machine that the several operations necessary to the performance of their functions may not only follow each other in quick succession but may, in each instance, be as far as possible so perfect as to result that on the whole rapidity of operation, *i. e.* a high quantity of output for any given period, will be one of its characteristic features.

The invention will be found fully illustrated in the accompanying drawings wherein, Figure 1 is a view of the right hand end of the machine; Fig. 2 is a front view of the left hand end portion of the machine, showing means for conducting the caps to the machine proper; Fig. 3 is a plan view of said means; Fig. 4 is a diagrammatic view illustrating a modification of said means; Fig. 5 is a plan view, certain parts being removed and others broken away; Fig. 5ª is a plan view of the table with the super-structure removed; Fig. 6 is a plan view of certain parts for effecting, among other functions, the feeding of the caps to the assembling position; Fig. 7 is a view of the left hand end of what is shown in Fig. 6; Fig. 8 is a right hand end view of what is shown in Fig. 6; Figs. 9 and 10 are sectional views on the lines $x$—$x$ and $y$—$y$, respectively, of Fig. 5; Fig. 11 is a view illustrating a detail of the cap positioning means; Figs. 12 and 13 are detail views of the die and stripper, Fig. 12 being a plan view and Fig. 13 a longitudinal sectional view; Fig. 14 is a view partly in elevation and partly in section in a line substantially midway of the path of feed; Figs. 14ª, 14ᵇ, and 14ᶜ illustrate details of Fig. 14; Fig. 15 is a plan view taken just below the under surface of the table; Fig. 16 is a view in front elevation of the cork positioning means shown in Fig. 15; Figs. 17 and 18 are details of the same; Figs. 19 and 20 are detail views of the paper advancing means; Fig. 21 shows the plunger for driving the paper disk and the cork disk home into the cap; Fig. 22 is a detail of the cork hopper; Fig. 23 is a plan view of a bracket in which move the paper cutting plunger, the plunger shown in Fig. 21 and a shaft which acts to reciprocate said plungers; Fig. 24 is a bracket whereby said plungers are supported on the shaft; and, Figs. 25 and 26 are views showing a certain cam.

$a$ is the table having front and back depending walls $b$ and four supporting legs $c$. Near the right hand end of the machine there is journaled in the walls $b$ a shaft $d$ on which is a driving pulley $e$ at its rear end and a hand wheel $f$ at its front end, the hand wheel being adapted for adjusting manually various parts from shaft $d$. The pulley $e$ is loose on the shaft and may be caused to rotate the same through a clutch $f'$ controlled by a foot lever $g$.

Referring to Figs. 2–5 which show the means whereby the caps are successively fed or advanced toward the assembling mechanism, $h$ is an inclined chute whose side walls $i$ converge downwardly and which terminates at its upper end in a platform $j$, its lower end being adapted to discharge onto the table $a$. The metal caps are laid on the platform $j$ open side up and are brushed off the same by hand onto the chute $h$ where they slide down under a wall $k$ traversing the chute and pass between pins $l$ under said wall, said pins extending up toward but not quite to the wall; as the pins are spaced apart but slightly more than the diameter of a cap body, but less than the diameter of a cap flange, the caps are prevented from passing except open side up, their flanges then riding over the pins. In the chute are journaled sprockets m over which and a sprocket n on a shaft o journaled in the left hand ends of the walls b extends a crossed chain p, a portion of which near the walls k is held slightly above the surface of the chute h by the sprockets m. Alined with the lower end of the portion just referred to and resting on the chute is a strip q which and another strip r, also arranged on said chute, form a guide-way wide enough for one cap at a time to move therein, the strip r being deflected at its upper end so that it forms with the protruding portion of the chain p a flaring entrance to the guide-way mentioned. The chain moves in the direction of the arrow in Fig. 2, it acting against the caps in the flared portion of the guide-way in such manner as to keep them agitated and tending to move thus against it upwardly, whereby only one cap can enter the guide-way at a time and jamming is prevented. Fig. 4 shows a modification of this arrangement in which, instead of the chain presenting its side to the caps, it presents its face.

The shaft o is driven from shaft d through a chain s running over sprockets t and u.

Over a pulley v on shaft o and a small pulley w (Fig. 14) arranged in an opening x in the table a extends a belt y whose upper stretch runs on the table. The lower end of chute h extends over this belt, so that when the caps leave the chute they are received on to the belt, being by the latter advanced through a guide-way z which extends to a point just over the pulley w. The chute h may be provided with a cover 1 attached thereto by pins 2 so that it may be readily removed, and the guide-way z with a hinged cover 3, said covers having openings 4 permitting the operator to see that the caps are advancing properly.

5 is a slot formed in the table a in alinement with the belt y, and 6, 7 are spaced plates attached to the top of the table a in such manner that they overlap the slot 5. On these plates rest plates 8 and 9, respectively, which form therewith rabbets 10, thereby producing a guide-way in which the caps may move. On the plates 8 and 9 are the spaced plates 11 which overlap the rabbets 10 and act to prevent the caps having appreciable up and down movement. Plates 11 are bridged by a die 12 and they abut against a plate 13 formed on its under side with a groove 14 which so co-acts with spaced lining strips 15 as to form a continuation of the guide-way produced by the plates 6, 7, 8, 9 and 11. A groove 16 is formed in one side of the entire guide-way and in this are arranged spring fingers 17 and 18, the spring actuated fingers 18 having recessed ends adapted to receive the caps. When the caps enter the guide-way formed by the several plates above described, they tend to have a regular advancing movement which is imparted to them by the belt y, but the leading cap which is still under the control of the belt being meantime temporarily stopped in its advance by the spring finger 17, their movement thereafter is caused to be an intermittent one. The means for now imparting the intermittent advances to the caps is best shown in Figs. 11 and 14. Attached to the under side of the table a is a bracket 19 having a vertical apron 20 in which is a vertical slot 21 (Fig. 14$^c$) and two strips 22 forming a guide-way for a slide 23 (Figs. 14$^a$ and 14$^b$) having a stud 24 on which runs a roller 25 which engages with a groove 26 in one face of a cam 26$^a$ on shaft d, said shaft d and the stud being arranged to penetrate the slot 21. Said slide carries a cross-sectionally dove-tailed guide 27 on which moves horizontally a slide 28. The slide 28 is reciprocated by a pitman 29 which connects it with a lever 30 having a shaft 31 for its fulcrum and a roller 32 which runs on the periphery 33 of the cam 26$^a$; in order to adjust the parts so that each cap will start its intermittent advance from a predetermined point in the guide-way, the lever 30 carries a set-screw 34 which takes up against the apron and limits the movement of the lever in that direction, a spring 35 which connects said lever with the frame tending to hold its roller against the cam. The slide 28 is rabbeted in its top portion and in the rabbet (36) is fitted a plate 37 having at its top edge three fingers 38 and 39, the finger 39 being downwardly yielding by virtue of a spring 40. The plate 37 moves in the slot 5, first to the right at such a level that the fingers 38 and 39 will advance the caps, then downwardly, then to the left at a lower level, and then up, these movements being derived from the combined movements of the guides 23 and 28.

The die 12 has a hole 41 through which the paper disks are cut and forced down into the caps, while the plate 13 has a similar hole 42 down through which the cork disks are forced into the caps, these holes being over the guide-way in which the caps are intermittently advanced. The plate 37 has a range of movement coincident with the distance between the holes 41 and 42, so that as the plate 37 rises its finger 39 first interposes itself between the cap which is immediately held back by the finger 17 and the next succeeding cap, and upon the next movement of the plate (to the right) said finger moves this cap past the finger 17 to a position squarely under the opening 41. When the plate 37 again makes its complete cycle of movement and rises, the left hand finger 38 ascends relatively behind the cap under the hole 41 and in the next movement of the plate 37 said cap is advanced to a position squarely under the hole 42. The next advance of the cap from under hole 42 (i. e. the discharge movement thereof) is effected in substantially the same manner, this time by the right hand finger 38.

This paper strip is fed forward by the following means: A roll of paper 43 is journaled in a part of a bracket 44 which surmounts the right hand end of the machine and the strip of paper is led down around a guide 45 through a stripper 46 (Figs. 12, 13 and 14), moving in a direction at right angles to the path of movement of the caps. This stripper surmounts the die 12 and it has an opening 47 coinciding with the opening 41. In the bracket 19 is mounted a non-rotary stub-shaft 48 and it carries on its free end a fixed collar 49. Fulcrumed on the shaft is a lever 50 having two arms 51 (Figs. 1 and 14) and 52 (Figs. 1, 15 and 20); the arm 51 carries a roller 53 which is normally held against a cam-way 54 on the cam 26ª by a spiral spring 55 engaging the arm at one end and the collar 49 at the other and coiled about the stub-shaft 48. The arm 52 carries a table 56 with a convex face, said table being arranged to vibrate under the paper strip, the arm 52 projecting up through an opening 57 in the bracket 19 (Fig. 15) and an opening 58 in the table a (Fig. 5ª). A gripper 59 is pivoted in the arm 52 above the table 56, it having movement on its pivot back and forth over the table in such manner that as the arm moves to the left in Fig. 20 its lower pointed end, which is close to the table, slides freely over the paper strip, but upon the return movement of the arm said gripper will coöperate with the table to grip the strip and advance it. The proper movements of the gripper as the arm 52 rocks are insured by a fiber rod 60 which is pivoted in the guide 45 and penetrates the gripper, a spring pressed plate 61 being arranged in the gripper to bear against the rod and thus produce such a resistance as between the gripper and the rod as to properly accomplish the movements of the gripper as aforesaid.

The cork disks are properly fed to the hole 42 by the following means: In the plate 13 is an arc-shaped slot 62 and a guideway or groove 63 into which said slot opens, the groove terminating in the opening 42. A bridge 64 spans the groove, acting to keep each disk in the groove as it is advanced, as hereinafter described, from one end thereof to the opening 42, and this bridge and the plate 13 support three or more rods 64' which form an open hopper for the cork disks. This hopper is surmounted by a tubular hopper 65 having a gate 66 which may be opened from time to time to permit some of the disks which are therein to drop into the open hopper. On an arm 67 of the slide 23 is arranged a vertical stud 68 whose upper end is guided in a hole 69 in the table a. On this stud is fulcrumed a bell-crank lever 70 on which rests a crank 71 which is penetrated by the stud 68 and whose position relatively to the lever 70 may be adjusted by a bolt 72 and a set-screw 73; the finger 74 shown in Figs. 16 and 17 is carried by this crank and is adapted to project up through the slot 62 so as to detach the lowermost disk in the open hopper and advance it to the opening 42. The movement of the finger 74 is somewhat similar to that of the plate carrying fingers 38 and 39; i. e., while the slide 23 is rising and falling the lever 70 is oscillating in a horizontal plane, the whole resulting in the finger moving in one direction in one plane, so as to advance the disks, then descending, then moving back in another direction in another plane, clearing the disks, and then rising to the original or operative plane. The oscillation of the lever 70 is accomplished by a universal connection between said lever and lever 30 through a pitman 75 connecting clevises 76 and 77 pivoted in said levers.

There now remains to be described the means for cutting out and forcing the paper disks home in the caps and for forcing the cork disks into the caps over the paper. The slide 23 is tapped at 78' at its upper end to receive the lower threaded end of a shaft 78 which extends through an opening 79 in the table a and which carries, pinned to it, a head 80. From this head depend plungers 81 and 82, the shaft and the two plungers being guided in the bracket 44 (Figs. 1 and 23). The plunger 81 registers with the opening 41 and the plunger 82 with the opening 42, and as the shaft 78 rises and falls with the slide 23, the plunger 81 which coöperates as a die with the die 12, cuts out a paper disk from the strip and forces it into the cap below the opening 41, while the plunger 82 forces the waiting disk home into the cap on top of the paper disk. As the plunger 82 is intended to complete the operation of forcing the disks home, it extends slightly below the plunger 81 as shown in Fig. 14 and is cushioned by a spiral spring 83 interposed between its upper end and a bracket 84 on the head 80, in which said plunger slides.

Having thus fully described our invention, what we claim as new and desire to secure by Letters Patent is:

1. In a machine for assembling bottle caps or the like and articles to be received thereby, the combination, with a suitable support, of means for effecting the mechanical association of said caps and the material forming the articles, and means, having its cap-engaging portion substantially constantly presented in substantially its entirety toward the line of movement of the caps, and movable in an endless path, for bringing the caps into the operative control of the first-named means, substantially as described.

2. In a machine for assembling bottle caps or the like and articles to be received thereby, the combination, with a suitable support having a part of its surface forming a guideway for the caps, of means for effecting the mechanical association of the caps and the material forming the articles, and means, having its cap-engaging portion substantially constantly presented in substantially its entirety toward said surface and movable in an endless path, for bringing the caps into the operative control of said first-named means, substantially as described.

3. In a machine for assembling bottle caps or the like and articles to be received thereby, the combination, with a suitable support, of means for effecting the mechanical association of said caps and the material forming the articles, and means, having its cap-engaging portion substantially constantly presented toward, and movable intermittently into, the line of movement of the caps, for bringing the caps into the operative control of the first-named means, substantially as described.

4. In a machine for assembling bottle caps or the like and articles to be received thereby, the combination, with a suitable support, of means for effecting the mechanical association of said caps and the material forming the articles, and means for bringing the caps within the operative control of said first-named means, said second-named means being movable in an endless path and in a plane intersecting the plane of the top of the caps when in the operative control of said first-named means, substantially as described.

5. In a machine for assembling bottle caps or the like and articles to be received thereby the combination, with a suitable support, of means for effecting the mechanical association of said caps and the material forming the articles, means, having its cap-engaging portion substantially constantly presented in substantially its entirety toward the line of movement of the caps and movable in an endless path and in a plane intersecting the plane of the caps when in the operative control of the first-named means, for bringing the caps into the operative control of said first-named means, substantially as described.

6. The combination, with a suitable support having a rectilineal guideway for the caps, of a plurality of plungers movable to and from the guideway, means for reciprocating them substantially together and means movable in an endless path for positioning each cap first relatively to one and then relatively to the other of said plungers, substantially as described.

7. The combination, with a suitable support having a rectilineal guideway for the caps, of a plurality of plungers movable to and from the guideway, means for reciprocating them, means for guiding a strip in operative alinement with one of said plungers, a die coöperative with said plunger to form disks from said strip, and means movable in an endless path for positioning each cap first relatively to one and then relatively to the other of said plungers, substantially as described.

8. The combination, with a guideway for one of the parts to be assembled and means for effecting the assembling, of means movable in an endless path for effecting the advance of said parts toward the assembling means, said means being adapted to intermittently project through the cap sustaining surface of the guideway, substantially as described.

9. The combination, with a slotted guideway for one of the parts to be assembled and means for effecting the assembling, of means movable in an endless path for effecting the advance of said parts toward said assembling means, being adapted to intermittently project into said guideway through the slot thereof, substantially as described.

10. In a machine for assembling caps and their lining disks, the combination, with a slotted guideway for one of the parts to be assembled and means for effecting the assembling, of means for effecting the advance of said parts toward said assembling means, said means being adapted to project through said slot into the guideway, and members reciprocatory at an angle to each other, one of said members carrying the other and said other member carrying said last-named means, substantially as described.

11. The combination, with a slotted guideway for one of the parts to be assembled and a plurality of means, each alined with said guideway, for effecting the assembling, of a device movable in an endless path through said slot into the guideway and means for moving said device in one direction with its acting portion or portions projecting into said guideway and in the reverse direction with said portions withdrawn from said guideway, substantially as described.

12. The combination, with a slotted guideway for one of the parts to be assembled and a plurality of plungers, each alined with said guideway, for effecting the assembling, of a device reciprocatory in the direction of feed and also at an angle thereto through said slot into said guideway, and means having projections for moving said device in one direction with said projections extending into said guideway and in the reverse direction with said projections withdrawn from said guideway, substantially as described.

13. The combination, with a guide-way and a hopper for parts to be assembled with other parts, said hopper being arranged over the guideway, of means for assembling the parts in the hopper with the other parts, means for advancing said other parts toward the assembling means, and means for advancing the parts in said hopper toward the assembling means comprising a device movable in one direction with a portion thereof projecting above the guideway and in the other direction with said portion below the guideway, substantially as described.

14. The combination, with means for assembling the parts of the article to be produced and guideways leading thereto of devices for advancing each part through its guideway toward the assembling means, said devices each having a projection adapted to enter the guideways and being each movable lengthwise of the guideways, and means for alternately moving said devices into and out of positions where their projections enter the guideways, substantially as described.

15. In a means for advancing a flexible strip, the combination of a reciprocatory member having a bearing surface for the strip, a pivoted gripper projecting toward said surface and into close proximity thereto, and means for impeding, during the advance movement of said member, the movement therewith of the gripper, substantially as described.

16. The combination of a suitable support, a reciprocatory member having a bearing surface for the strip, a pivoted gripper projecting toward said surface and into close proximity thereto, and means, carried by said support, for impeding, during the advance movement of said member, the movement therewith of the gripper, substantially as described.

17. The combination, with a suitable support, of means for assembling caps and other devices to be mechanically associated therewith, of a hopper for said devices, and means, limited for oscillatory movement in substantially a horizontal plane, for successively removing said devices from the hopper and advancing them to the assembling means, substantially as described.

18. The combination, with a guideway having a cap-supporting surface of limited width, said surface having a widened entrance portion, of means movable lengthwise of the guideway in said entrance portion and toward the entrance thereof and projecting through said surface for agitating the articles adapted to pass through the guideway, substantially as described.

19. The combination, with a suitable support, of reciprocating plungers, dies coöperative therewith, and means for successively positioning a cap between the dies and plungers, said means comprising a part movable back and forth in an endless path and having projections successively engageable with the cap, substantially as described.

20. The combination, with a suitable support, of a reciprocating plunger, a die coöperative therewith, and means, movable in a line intersecting the line of movement of the plunger and also in a line intersecting the plane of the acting portion of said die, for successively positioning a cap between the die and plunger, substantially as described.

In testimony, that we claim the foregoing, we have hereunto set our hands this 2nd day of July, 1907.

BENJAMIN ADRIANCE.
AMOS CALLESON.

Witnesses:
JOHN W. STEWARD,
WM. D. BELL.